Jan. 6, 1959

J. J. SHAPIRO 2,867,784

CORROSION TESTING DEVICE

Filed Oct. 7, 1953

INVENTOR.
JUSTIN J. SHAPIRO
BY Herman L. Gordon

ATTORNEY

United States Patent Office 2,867,784
Patented Jan. 6, 1959

2,867,784

CORROSION TESTING DEVICE

Justin J. Shapiro, Silver Spring, Md., assignor to American Instrument Company, Inc., Silver Spring, Md.

Application October 7, 1953, Serial No. 384,639

3 Claims. (Cl. 336—134)

This invention relates to corrosion testing devices, and more particularly to a device for testing heat resistant alloys containing iron, such as are used in aircraft engine exhaust systems, for corrosion.

A main object of the invention is to provide a novel and improved corrosion testing device which detects magnetic ferrite precipitation in a ferrous alloy by indicating changes in magnetic permeability in the alloy caused by carbon absorption and other factors accompanying corrosion, the device being compact in size, being extremely sensitive, and being stable in operation.

A further object of the invention is to provide an improved apparatus for testing ferrous alloys for corrosion, said apparatus being rugged in construction, being provided with its own calibrating means, and giving accurate indications which enable the user to immediately detect hidden corrosion in relatively inaccessible locations, such as within stainless steel exhaust conduits of aircraft engines, the observations being obtainable without requiring destruction or alteration of the parts being tested.

Further objects and advantages of the invention will become apparent from the following description and claims, and from the accompanying drawings, wherein:

Figure 1:
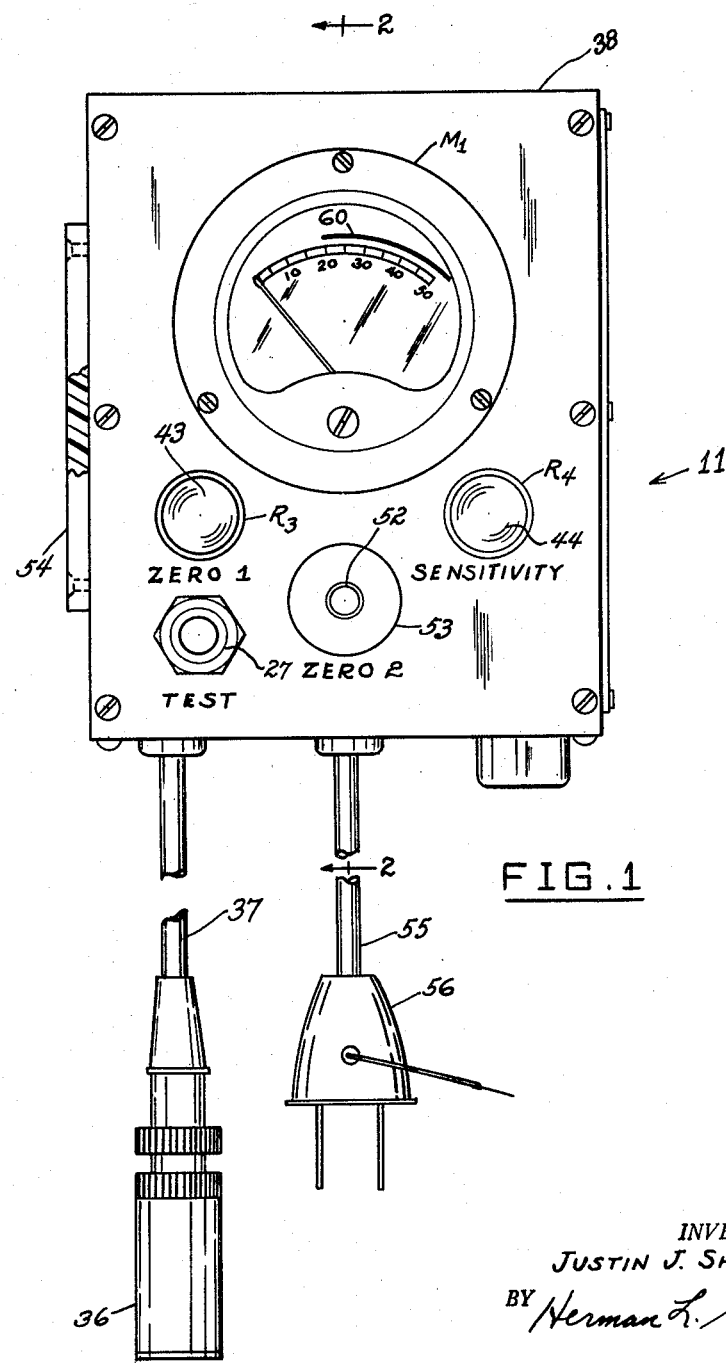
Figure 1 is a front elevational view, partly in cross-section, of an improved corrosion testing apparatus constructed in accordance with the present invention.
Figure 2:
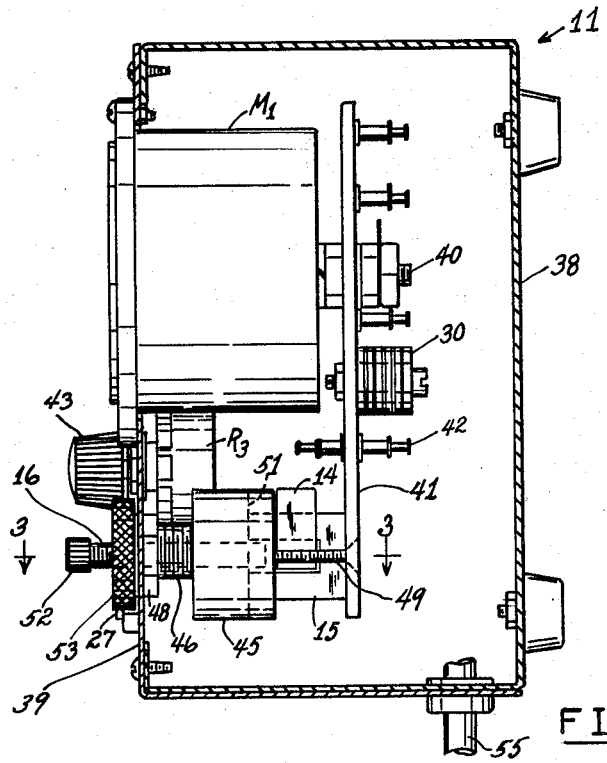
Figure 2 is a vertical cross-sectional view taken on line 2—2 of Figure 1.

Stabilized stainless steel alloys when used in aircraft engine exhaust systems, under severe operating conditions, have been shown to undergo carbon absorption with a resulting carbide precipitation at or near the grain boundaries. Certain alloys have the peculiar property of becoming extremely brittle as carbon absorption, and other structural chagnes take place. Some alloys disintegrate from the inside without any visible indication outwardly. Failure of exhaust parts have been ascribed to this cause, and timely detection is therefore desirable.

The aforementicned heat resistant alloys in their undisturbed state are austenitic in character; the constituents of the steels are in solid solution and the steels are non-magnetic, or only very slightly magnetic. As deterioration and structural changes, due to carbon absorption and ferrite precipitation, and other factors, progress, the affected areas show a magnetic permeability, and this permeability increases in direct relation to the increase in brittleness and deterioration of the subject areas.

The device of the present invention is especially intended for measuring the low permeabilities, if present initially, and the increase in permeabilities as structural changes take place in the normally substantially non-magnetic alloys.

Referring to the drawings, the test apparatus comprises a main unit 11 containing the major portion of the circuit elements and other elements of the apparatus, and a probe unit which is detachably connected to the main unit 11.

The main instrument unit 11 comprises a housing 38 of sheet steel or other suitable magnetic material, having the front wall 39 in which is mounted the microammeter $M_1$. Microammeter $M_1$ has the terminals 40 projecting from its rear wall inside housing 38, and secured to said terminals is the supporting plate 41 of insulating material on which is mounted the rectifier 30, said plate 41 being provided with a plurality of connection posts 42 for making the various internal circuit connections of the unit.

Mounted on front wall 39 below the meter $M_1$ are the potentiometer $R_3$ and the meter sensitivity-controlling rheostat $R_4$, these elements being provided with suitable control knobs shown respectively at 43 and 44.

Mounted on front wall 39 below potentiometer $R_3$ is the push-button switch 27.

Figure 3:
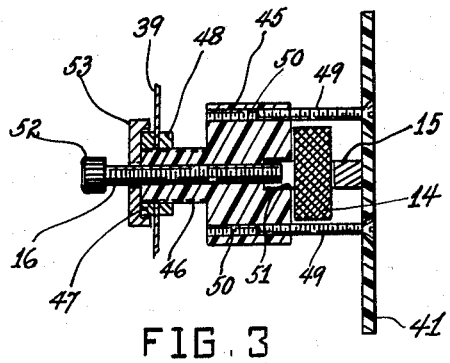
Figure 3 is a cross-sectional detail view taken on line 3—3 of Figure 2.

Designated at 45 is a cylindrical block member formed with an externally threaded, reduced axial boss 46 which extends through an aperture in front wall 39 below meter $M_1$ and which is clampingly secured to said front wall by respective clamping nuts 47 and 48 engaged on boss 46 on opposite sides of wall 39, as shown in Figure 3. Block member 45 is secured to plate 41 by respective machine screws 49, 49 extending through the plate and threadedly engaged in respective tapped bores 50, 50 formed in block 45 at diametrically opposite locations thereon and extending perpendicularly to the plate 41, as shown. The rear face of block 45 is formed with a diametrically extending groove 51 extending transverse to the plane of screws 49, 49, which receives the end portions of the legs of the U-shaped core 15 of inductance 13, the bight portion of said core being rigidly clamped against plate 41 by the tension exerted by screws 49, 49.

It will be understood that screws 49, 49 are tightened prior to the tightening of the clamping nuts 47 and 48, the core 15 and block 45 being secured to the plate 41 by the screws 49, 49 prior to the insertion of the boss 46 through the aperture provided therefor in front wall 39.

Mounted on one of the legs of core 15 is the coil 14. The block 45 and its axially extending boss 46 are formed with an axially extending internally threaded bore in which the inductance-adjusting screw 16 is threadedly engaged, said screw projecting into the groove 51 between the legs of core 15, as shown. Screw 16 is provided with the adjusting head 52 and with the knurled circular lock nut 53 which, when tightened against boss 46, locks the screw 16 in an adjusted position relative to core 15.

Secured on a side wall of housing 38 is a non-magnetic calibrating plate 54, of any suitable non-magnetic material, such as plastic material, said plate 54 being of uniform thickness and serving as a spacer to provide a non-magnetic gap between the rounded contact ends of the probe and the magnetic side wall of housing 38 when said ends are engaged on said plate during the calibration of main unit 11.

The alternating current line wires are contained in a line cord 55 extending from housing 38 and provided with a suitable male plug 56 for connecting the apparatus to an alternating current supply receptacle.

The apparatus is used as follows:

(1) With the probe away from any magnetic material, the circuit is first balanced by means of potentiometer $R_3$. If a balance (zero reading on meter $M_1$) cannot be obtained, said potentiometer is adjusted to obtain the minimum reading on meter $M_1$. The reading on meter $M_1$ is then made as low as possible by adjusting the screw 16 of inductance 13. If the meter reading cannot be thus brought to zero, a further adjustment of potentiometer $R_3$ is made to bring the meter reading to zero.

(2) The probe is then held with its contact tips against calibration plate 54, and, while depressing the test button 52 (closing switch 27), the sensitivity knob 44 is rotated to increase the resistance of rheostat $R_4$ to obtain an initial calibration reading on meter $M_1$ in accordance with the particular alloy being tested. At this calibrated sensitivity a deteriorated sample of the particular alloy being tested will cause the meter indication to fall within a zone defined by an arcuate line 60, suitably colored, located adjacent to the upper portion of the meter scale.

(3) The probe is then applied to the part to be tested, the test button 52 being depressed and the reading on meter $M_1$ being observed. If the reading falls within the zone defined by the arcuate line 60, the permeability of the part tested has increased beyond the safe limit and some specific action, such as patching, replacing, or heat treatment is recommended. If the material of said part has not deteriorated, the reading will be below the arcuate zone 60. On alloys which can be reconditioned by a heat treatment, the arcuate zone selects the tested parts which may be successfully heat treated.

It will be understood that deterioration of the part may have progressed beyond the safe limit, but that the part may be still capable of recovery by suitable heat treatment. This will be indicated when the meter reading is within a zone between certain limits on the meter scale, as, for example, within the zone defined by the arcuate line 60.

In the subsequent heat treatment of said part, the return of the material to its safe condition may be followed and checked by successive permeability tests of the part by the above procedure, until the meter reading is well below the arcuate line 60 at the calibrated sensitivity for that alloy.

Due to the inevitable wearing down of the tips on the probe core, a decrease in the inductance of the probe coil will occur. Such changes may be compensated for by adjustment of the "Zero 2" knob 52. When this adjustment is no longer adequate, a new probe head may be substituted for the old one.

While a specific embodiment of a corrosion testing device for measuring the deterioration of normally non-magnetic alloys has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a testing device of the character described, a wall, a support plate, means securing said support plate in a position spaced from said wall, a block member secured to said wall, the end of said block member being formed with a recess facing said support plate, a U-shaped magnetic core secured between said plate and said block member, said core having spaced legs received in said recess, and a magnetic adjusting member movably engaged in said block member and extending between and parallel to said spaced legs.

2. In a testing device of the character described, a wall, a support plate, means securing said support plate in a position spaced from said wall, a block member adjustably secured to said wall, the end of said block member being formed with a transverse recess facing said support plate, a U-shaped magnetic core secured between said plate and said block member, said core having spaced legs received in said recess, and a magnetic adjusting screw threadedly engaged through said block member and extending parallel to and between said spaced legs.

3. In a testing device of the character described, a housing having a front wall, a support plate, means securing said support plate in a position parallel to and spaced from said front wall, a block member adjustably secured to said wall, the end of said block member being formed with a transverse groove facing said support plate, a U-shaped magnetic core secured between said plate and said block member, said core having spaced legs received in said groove, and a magnetic adjusting screw extending through said wall between and parallel to said legs and threadedly engaged through said block member, the end of the screw projecting into said groove between said spaced legs.

References Cited in the file of this patent

UNITED STATES PATENTS

| | | |
|---|---|---|
| 1,925,904 | Mayne | Sept. 5, 1933 |
| 1,989,037 | Brown | Jan. 22, 1935 |
| 2,064,772 | Vogt | Dec. 15, 1936 |
| 2,407,916 | Berg | Sept. 17, 1946 |
| 2,432,811 | Sams | Dec. 13, 1947 |
| 2,447,911 | Mages et al. | Aug. 24, 1948 |
| 2,625,585 | Krouse | Jan. 13, 1953 |
| 2,665,333 | Dunipace et al. | Jan. 5, 1954 |
| 2,717,984 | Hale et al. | Sept. 13, 1955 |